United States Patent

Aymerich et al.

Patent Number: 5,454,616
Date of Patent: Oct. 3, 1995

[54] AUTOMOBILE SUN VISOR

[75] Inventors: José Aymerich; Jesús Prat, both of Rubi, Spain

[73] Assignee: Industrias Techno-Matic, S.A., Barcelona, Spain

[21] Appl. No.: 78,303
[22] PCT Filed: Oct. 15, 1992
[86] PCT No.: PCT/ES92/00071
§ 371 Date: Jun. 18, 1993
§ 102(e) Date: Jun. 18, 1993
[87] PCT Pub. No.: WO93/08038
PCT Pub. Date: Apr. 29, 1993

[30] Foreign Application Priority Data

Oct. 23, 1991 [ES] Spain .................... 9102450

[51] Int. Cl.$^6$ .................... B60J 3/00
[52] U.S. Cl. .................... 296/97.1; 296/97.5; 296/97.9; 296/97.12
[58] Field of Search .................... 296/97.1, 97.5, 296/97.9, 97.12, 97.13

[56] References Cited

U.S. PATENT DOCUMENTS

| 4,494,789 | 1/1985 | Flowerday | 296/97.5 |
| 4,773,699 | 9/1988 | Cebollero | 296/97.1 |
| 5,054,839 | 10/1991 | White et al. | 296/97.1 |

FOREIGN PATENT DOCUMENTS 0399187 11/1990 European Pat. Off. .
58-18814 2/1983 Japan .

Primary Examiner—Andrew C. Pike
Attorney, Agent, or Firm—Michael J. Striker

[57] ABSTRACT

An automobile sun visor has a one-piece hollow body member having a substantially rectangular cross section with two small sides and two large sides and a plurality of reinforcing ribs located in an interior of the body member, at least some of the reinforcing ribs extending from one of the larger internal sides and having free ends abutting against another of the larger internal sides so as to prevent deformation of the hollow body member.

9 Claims, 2 Drawing Sheets

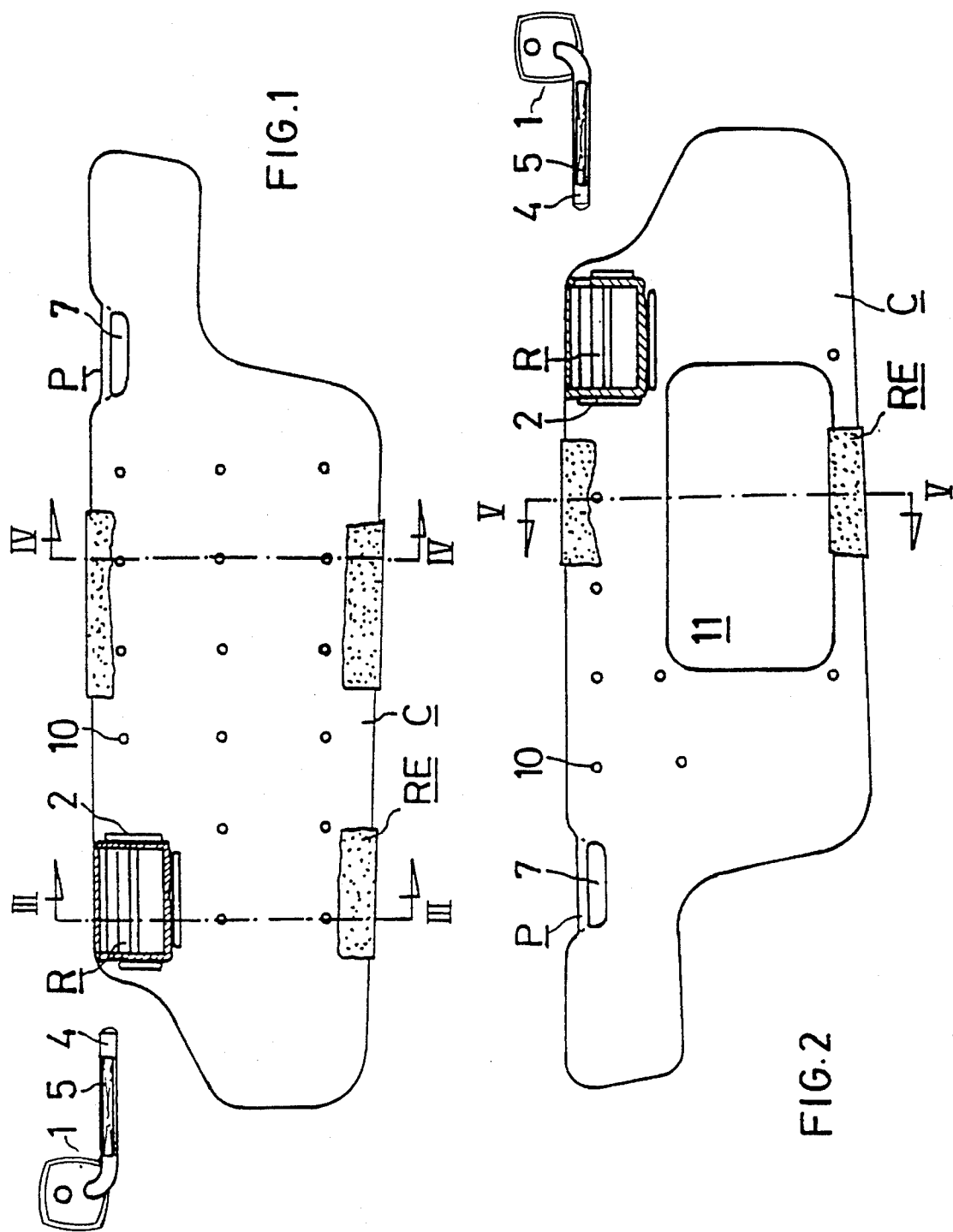

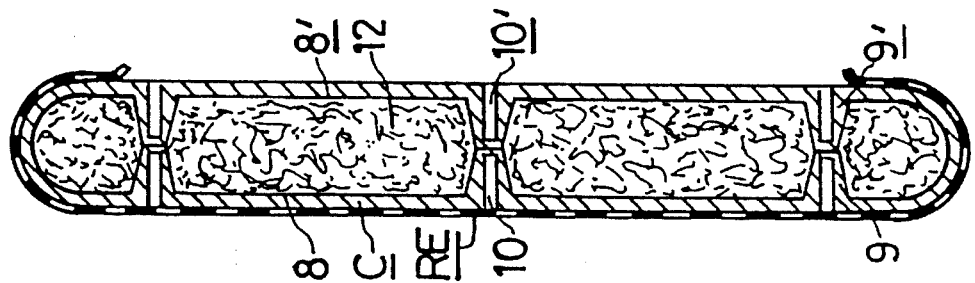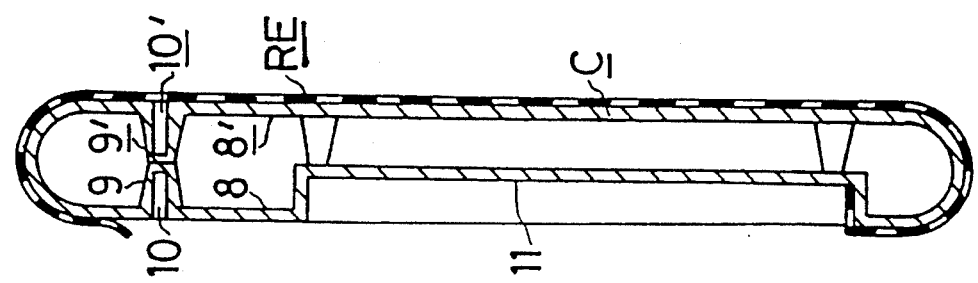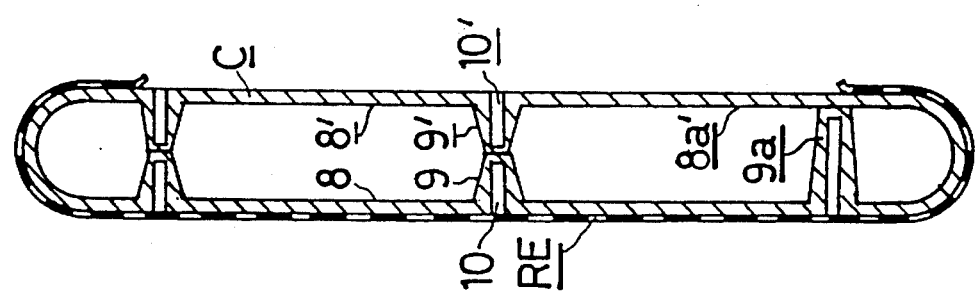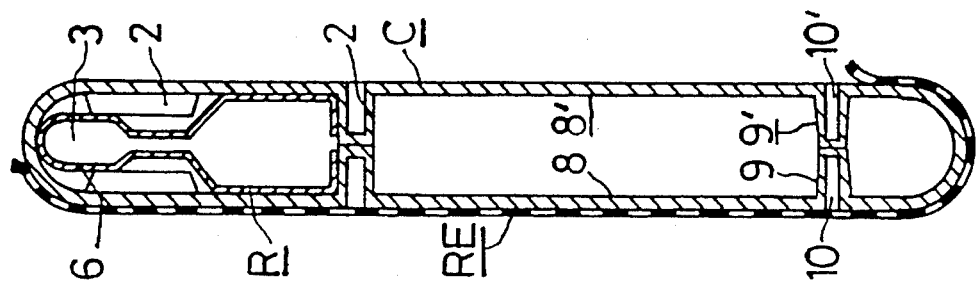

AUTOMOBILE SUN VISOR

BACKGROUND OF THE INVENTION

The present invention relates to a sun visor for automobiles and in particular to a sun visor produced by blow molding of a plastic material.

Automobiles sun visors produced by blow molding of a plastic material, for example polyethylene, are well known. These sun visors may comprise, like the visors based, for example, on a net structure, the so-called vanity mirror, which is usually arranged in the passenger side sun visor, and which may simply be superimposed on the corresponding side of the sun visor or be attached thereto by a cavity prepared for such purpose.

Further to the vanity mirror, the sun visors generally comprise a retaining spring and a hanging bridge situated in corresponding ends of the sun visor. The purpose of the retaining spring is to receive the pivot pin of the bent support attached to the vehicle structure so that, when engaged, the sun visor may be moved about the pivot pin by a simple manual operation and occupy stable positions of use freely selected by the user. The hanging bridge may be engaged, in turn, to a support member also attached to the vehicle structure so that, once engaged, they provide the sun visor with an auxiliary point of support which helps to withstand possible mechanical overloads capable of affecting the engagement of the retaining spring and the pivot pin of the bent support and weakening their resistance to untimely movement.

As an example of a sun visor manufactured from a one-piece hollow body member blow molded from a plastics material comprising the above mentioned elements, there may be mentioned Spanish patent P 9100391. This patent describes a sun visor with the hollow body member formed at one end thereof with a through orifice defining a hanging bridge and which internally houses and retains at the opposite end a retaining spring which is accessible from the outside of the sun visor only through a pertinent opening.

In general, the sun visor hollow body members formed by blow molding of plastics materials have a limited mechanical strength, which, under normal conditions of use, easily causes deformation. To avoid this drawback, the hollow body members are generally provided with additional structural reinforcement members. In this regard, there may be mentioned those provided by said Spanish patent P 9100391 consisting basically of a filling contained inside said body member. The filing is formed by an appropriate plastics material, such as polyurethane. The filling of the one-piece hollow body member by plastics materials to increase the mechanical strength thereof and avoid deformation under normal conditions of use suffers as the main drawback from a high production cost which, obviously, makes the finished product more expensive.

SUMMARY OF THE INVENTION

Accordingly, it is an object of the present invention to provide an automobile sun visor which eliminates the above discussed disadvantages and in particular eliminates high financial costs of additional structural reinforcement means.

In keeping with these objects and with others which will become apparent hereinafter, one feature of the present invention resides, briefly stated, in an automobile sun visor of the above mentioned type in which larger facing internal sides of a one-piece hollow body member of the sun visor are formed with a plurality of reinforcing ribs which are dimensioned so that free ends of the reinforcing ribs bear against an opposite side, and the ribs are distributed depending on the dimensions and contour of the sun visor acting as a structural reinforcement and avoiding under normal conditions of use deformation of the hollow body member.

When the automobile .sun visor is designed in accordance with the present invention, it avoids the disadvantages of the prior art and provides highly advantageous results in reducing the cost of reinforcing means.

According to one characteristic embodiment of the invention, the reinforcing ribs are formed facing each other on both sides of the hollow body member and are dimensioned in such a way that their respective free ends bear against each other.

According to another embodiment of the invention, the reinforcing ribs are formed on one or the other or on both sides of the hollow body member and are dimensioned in such a way that their free ends bear against the internal flat surface of the opposite side.

The above described features of the sun visor of the invention provide the one-piece hollow body member with a high mechanical strength which, under normal conditions of use, prevents it from becoming deformed and furthermore, at a low cost since the reinforcing ribs are obtained during the corresponding step of the production process by known, relatively simple mechanical processes.

The inner free volume of the one-piece hollow body member may be filled by a plastics material, preferable polypropylene, exclusively to avoid the sound effects that the one-piece hollow body member may generate for it being an acoustic cavity. Obviously, the filling of the one-piece hollow body member or, what is the same, its soundproofing will depend on the level of finish required by the vehicle passenger compartment in each particular case.

It is to be noted that, as said above, both the one-piece hollow body member and the external covering thereof and, optionally, the sound proof filling of the sun visor of the invention are composed, preferably, of polypropylene. As is known, this material combines with its mechanical properties, which are particularly indicated for the proposed purposes, the fact that it is a completely recyclable material, i.e. at the end of its useful life,the sun visor of the invention may be recycled and the constituent materials may be reclaimed for subsequent industrial reuse and, as a result of the above, the constituent materials of the sun visor of the invention are prevented from contributing to the pollution and consequent degradation of the environment as being industrial waste.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of the sun visor of the invention.

FIG. 2 is a front view of another embodiment of the sun visor of the invention.

FIG. 3 is a cross section view on the line III—III of FIG. 1.

FIG. 4 is a cross section view on the line IV—IV of FIG. 1.

FIG. 5 is a cross section view on the line V—V of FIG. 2.

FIG. 6 is a cross section view of a further embodiment of the sun visor of the invention.

DESCRIPTION OF THE PREFERRED EMBODIMENTS

The automobile sun visor of the invention described as an example of embodiment comprises, as shown in FIGS. 1 and 2 of the drawing sheets, the one-piece hollow body member C, the retaining spring R, the hanging bridge P, and the outer covering RE.

FIGS. 1, 3, and 4 show how the automobile sun visor one-piece hollow body member C is essentially a rectangular prism and the contour thereof depends on the configuration of the vehicle passenger compartment in each case. The contour of the sun visor shown in FIG. 1 is given only as an example.

The hollow body member C, as said above, is formed by blow molding of a plastics material, preferably polypropylene.

FIG. 1 shows how the hollow body member C is provided at one end thereof, suitably disposed relative to the bent support 1 which is attached to the vehicle structure, with the retaining spring R which, in this embodiment, is housed entirely within the hollow body member C. FIGS. 1 and 2 show how the retaining spring R is framed by the recesses 2 which are formed in the hollow body member C and which prevent the retaining spring R from being moved out of position.

The retaining spring R is made preferably from high spring metal sheet and, as shown in FIG. 2, forms the longitudinal cavity 3 which is formed to snugly receive the corresponding portion of the pivot pin 4 of the bent support 1.

The longitudinal cavity 3 of the retaining spring R and the portion of the pivot pin 4 of the bent support 1 are dimensioned and shaped in such a way that, once coupled together, they allow the sun visor to be rotated around the pivot pin 4 and stably occupy any position of use selected by the user, i.e., independently of the vibrations caused by the vehicle when running.

FIGs. 1 and 3 show how the longitudinal cavity 3 of the retaining spring R and the pivot pin 4 of the bent support 1 are provided with positioning flats 5 and 6, respectively. Their purpose is to ensure the rest position of the sun visor of the invention.

FIG. 1 shows how the hollow body member C, at the opposite end to the one occupied by the retaining spring R, is formed with a through orifice 7 defining the hanging bridge P. The auxiliary support member also attached to the vehicle structure may slide through the through orifice 7. For greater clarity, it has not been shown in the drawings. As said above, the purpose of the auxiliary support member is to prevent the engagement of the pivot pin 4 of the bent support 1 with the retaining spring R being subjected to mechanical overloads, which may affect the correct operation of said engagement.

In this embodiment of the sun visor of the invention, FIGS. 3 and 4 show how each of the two larger facing internal sides, 8, and 8' respectively, of the hollow body member C are formed with corresponding facing reinforcing ribs 9 and 9'. The free ends of the ribs bear against each other so that, under normal conditions of use, they prevent the hollow body member C from being deformed or broken or torn.

FIGS. 3 and 4 show how the reinforcing ribs 9 and 9' are essentially frustoconical in shape, are relatively small, and are formed by punching during the forming process of the hollow body member C. The reinforcing ribs 9 and 9' may obviously have an other shape appropriate for the needs of each particular application.

The rib 9a appearing at the bottom of FIG. 4 projects outwardly from the side 8 and is sufficiently long to reach the flat inner surface 8a' of the opposite side 8'. This unique feature distinguishes the rib 9a from the other ribs 9 and 9' shown in the drawings. In this way, the reinforcement is obtained directly between the free end of the rib 9a extending from one of the sides (side 8 in the example of FIG. 4) and the opposite side 8'.

The number and layout of the reinforcing ribs 9 and 9' depend on the dimensions and configuration of the hollow body member C in each particular application, whereby the number and layout of the reinforcing ribs 9 and 9' shown in FIG. 1 are given only as an orientative example.

FIGS. 1, 3, and 4 show how the hollow body member C is provided with the outer covering, or sheath, RE, which has been shown in part in said Figures. The outer covering RE provides the sun visor of the invention with an external finish in keeping with the internal finish of the vehicle passenger compartment. Therefore the entry edges of the holes 10 and 10' formed during the punching of the hollow body member C to provide the structural reinforcing ribs 9 and 9', respectively, may not be perceptible to the touch under any circumstance.

FIGS. 2 and 5 show another embodiment of the automobile sun visor of the invention. In order to maintain an adequate continuity of disclosure, in this further embodiment like reference symbols have been given to all those parts which are common to the embodiment described before and illustrated in FIGS. 1, 3, and 4.

In this way, FIGS. 2 and 5 show how, in this further embodiment of the sun visor of the invention, the hollow body member C is formed, on the corresponding outer face thereof, with the cavity 11 having an essentially rectangular contour. This cavity 11 is for receiving a device of regular use such as, among others, the so-called vanity mirror which, for the same reasons as given above, has not been shown in the drawing figures.

FIGS. 2 and 5 show how the number and layout of the reinforcing ribs 9 and 9' provided in the hollow body member C differ from the number and layout of the reinforcing ribs 9 and 9' provided in the prior embodiment shown in FIGS. 1, 3, and 4. In fact, in this other embodiment of the sun visor of the invention shown in FIGS. 2 and 5, the number and layout of the reinforcing ribs 9 and 9' have been adapted to the structural reinforcement needs of the new configuration of the hollow body member C, such that, under normal conditions of use, the deformation, tearing, or breakage thereof is avoided.

The fact that the hollow body member C of the two foregoing embodiments described and illustrated in FIGS. 1, 3, and 4 and in FIGS. 2 and 5, respectively, is an acoustic cavity may cause sound effects which are inappropriate in cases where w high level of comfort is required in the vehicle passenger compartment.

To avoid the above described drawback, FIG. 6 shows a further embodiment of the sun visor of the invention. To maintain an adequate continuity of disclosure, the same reference symbols have been given in this further sun visor embodiment to all those parts which are common to the two embodiments described previously and shown in FIGS. 1, 3, and 4 and in FIGS. 2 and 5, respectively.

In this way, FIG. 6 shows how the inner volume of the hollow body member C has the sound-proofing filling 12 formed by a plastics material, preferably polypropylene.

In the three embodiments of the sun visor of the invention descried and shown in the drawing figures, the preferred material used for forming the hollow body member C, the outer covering RE and the sound-proofing filling 12 is, as has been said above, polypropylene. In this way, as described before, at the end of its useful life, the sun visor of the invention may be recycled, allowing for the subsequent industrial reuse of its constituent materials.

It will be understood that each of the elements described above, or two or more together, may also find a useful application in other types of constructions differing from the types described above.

While the invention has been illustrated and described as embodied in an automobile sun visor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An automobile sun visor comprising a one-piece hollow body member having a substantially rectangular cross section with two smaller internal sides and two larger internal sides; and a plurality of reinforcing ribs located in an interior of said body member, said reinforcing ribs extending from one of said larger internal sides and having free ends abutting against another of said larger internal sides so as to prevent deformation of said hollow body member, said reinforcing ribs being essentially frustoconical in shape, relatively small, and formed with cylindrical inner holes by punching during a forming process of said hollow body member.

2. An automobile sun visor as defined in claim 1, wherein said reinforcing ribs include ribs which extend from both said larger internal sides toward one another and have free ends abutting against one another.

3. An automobile sun visor as defined in claim 1, wherein said other larger internal side has an internal flat surface, and said free ends of said reinforcing ribs abut against said internal flat surface of said other larger internal side.

4. An automobile sun visor as defined in claim 1; and further comprising a sound-proof filling which fills the interior of said hollow body member.

5. An automobile sun visor as defined in claim 4, wherein said sound-proof filling is composed of polypropylene.

6. An automobile sun visor as defined in claim 1, wherein said hollow body member is composed of polypropylene.

7. An automobile sun visor as defined in claim 1; and further comprising a retaining spring fixedly attached to said hollow body member formed to receive a pivot pin of a bent support attached to a vehicle structure so that said retaining spring is rotatable about the pivot pin.

8. An automobile sun visor as defined in claim 1; and further comprising a hanging bridge attached to said hollow body member and engageable with a support attached to a vehicle structure.

9. An automobile sun visor as defined in claim 1; and further comprising a sheathlike external covering applied on said hollow body member and providing to said hollow body member a finish.

* * * * *